United States Patent
Kawauchi et al.

(10) Patent No.: US 8,805,570 B2
(45) Date of Patent: Aug. 12, 2014

(54) WORKPIECE MEASURING DEVICE, COLLISION PREVENTING DEVICE, AND MACHINE TOOL

(75) Inventors: Naoto Kawauchi, Takasago (JP); Yuichi Sasano, Takasago (JP); Shin Asano, Takasago (JP); Kenji Kura, Ritto (JP); Hirokazu Matsushita, Ritto (JP); Akihiko Matsumura, Ritto (JP); Masaru Higuchi, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 386 days.

(21) Appl. No.: 13/376,803

(22) PCT Filed: Nov. 10, 2009

(86) PCT No.: PCT/JP2009/069088
§ 371 (c)(1),
(2), (4) Date: Dec. 7, 2011

(87) PCT Pub. No.: WO2011/058618
PCT Pub. Date: May 19, 2011

(65) Prior Publication Data
US 2012/0089247 A1 Apr. 12, 2012

(51) Int. Cl.
*G06F 17/00* (2006.01)
*G06F 19/00* (2011.01)
*G06T 1/00* (2006.01)
*G06T 15/00* (2011.01)
*G06T 17/00* (2006.01)

(52) U.S. Cl.
USPC ............. 700/159; 700/98; 700/117; 700/163; 345/418; 345/419; 345/420

(58) Field of Classification Search
USPC ............ 700/98, 117, 159, 163; 345/418, 419, 345/420
See application file for complete search history.

(56) References Cited

U.S. PATENT DOCUMENTS 5,617,322 A * 4/1997 Yokota ............................ 700/98
5,675,720 A * 10/1997 Sato et al. ...................... 345/419

(Continued)

FOREIGN PATENT DOCUMENTS

| CN | 1241255 A | 1/2000 |
| JP | 4-89513 A | 3/1992 |

(Continued)

OTHER PUBLICATIONS

Notice of Allowance issued Jan. 7, 2013 for Taiwan Patent Application No. 098138242 with English Translation.

(Continued)

*Primary Examiner* — Ronald Hartman, Jr.
(74) *Attorney, Agent, or Firm* — Birch, Stewart, Kolasch & Birch, LLP

(57) ABSTRACT

A workpiece measuring device, a collision preventing device, and a machine tool acquires 3D data of the shape of a workpiece used to prevent a collision between the workpiece and part of the machine tool. A measuring section measures the distance to the workpiece through scanning in a non-contact manner; and a shape recognition section generates a 3D mesh structure. The coordinates of a measurement point on the workpiece based on distance information about the measured distance to the workpiece, and that generates a measurement geometry map such that, when the ratio of the number of times the calculated measurement point is included in one unit of the 3D mesh structure to the number of times a position of the workpiece corresponding to the one unit is scanned is equal to or larger than a predetermined threshold, the one unit is regarded as part of the workpiece are included.

6 Claims, 10 Drawing Sheets

(56) References Cited

U.S. PATENT DOCUMENTS

| | | | |
|---|---|---|---|
| 6,201,881 B1 * | 3/2001 | Masuda et al. | 382/100 |
| 6,260,000 B1 * | 7/2001 | Karasaki et al. | 702/155 |
| 6,867,772 B2 * | 3/2005 | Kotcheff et al. | 345/420 |
| 6,952,204 B2 * | 10/2005 | Baumberg et al. | 345/420 |
| 7,287,939 B2 | 10/2007 | Koch | |
| 7,333,105 B2 * | 2/2008 | Slabaugh et al. | 345/420 |
| 2002/0186216 A1 * | 12/2002 | Baumberg et al. | 345/422 |
| 2004/0174359 A1 | 9/2004 | Takagi | |
| 2006/0139358 A1 * | 6/2006 | Cho et al. | 345/506 |
| 2007/0132757 A1 * | 6/2007 | Hassner et al. | 345/420 |
| 2011/0254841 A1 * | 10/2011 | Lim et al. | 345/421 |

FOREIGN PATENT DOCUMENTS

| | | |
|---|---|---|
| JP | 7-295619 A | 11/1995 |
| JP | 2895316 B2 | 5/1999 |
| JP | 3170345 B2 | 5/2001 |
| JP | 2004-12431 A | 1/2004 |
| JP | 2004-12430 A | 4/2004 |
| JP | 2004-114203 A | 4/2004 |
| JP | 3571564 B2 | 9/2004 |
| JP | 2006102923 A | 4/2006 |
| JP | 200748210 A | 2/2007 |
| JP | 2009-258058 A | 11/2009 |
| JP | 2009-265023 A | 11/2009 |
| TW | 2009-24903 A | 6/2009 |
| TW | 360754 U1 | 7/2009 |
| WO | WO 02/23408 A1 | 3/2002 |

OTHER PUBLICATIONS

Office Action issued Nov. 1, 2013 for corresponding Chinese Application No. 200980160005.8 with an English translation.

Decision on Patent Grant issued Aug. 30, 2013 for corresponding Korean Patent Application No. 2011-7029414.

Decision to Grant a Patent issued Apr. 3, 2014 for corresponding Chinese Patent Application No. 200980160005.8.

* cited by examiner

WORKPIECE MEASURING DEVICE, COLLISION PREVENTING DEVICE, AND MACHINE TOOL

TECHNICAL FIELD

The present invention relates to a workpiece measuring device, a collision preventing device, and a machine tool, and particularly, to a workpiece measuring device, a collision preventing device, and a machine tool that are suitable for use in 3D machining a workpiece.

BACKGROUND ART

In general, when a numerical control (hereinafter, referred to as "NC") device is used to control a machine tool to perform machining, an NC program (NC data for machining) that describes the movement of a tool of the machine tool is debugged. Specifically, a workpiece serving as an object to be machined is placed on a table of the machine tool in advance, and an operator runs and verifies the NC program in each step.

At this time, part of the machine tool, such as a tool or a ram, may come into contact with the workpiece and be broken due to human error, such as a defect of the NC program and an incorrect operation by the operator (for example, see PTL 1).

In particular, the operation speed is set high to improve the work efficiency when a tool that is not used to cut the workpiece is set in position, or in a similar case. When the NC program is debugged in such a state, if part of the machine tool is almost brought into contact with the workpiece, it is difficult for the operator to instantly stop the operation of a main shaft of the machine tool at his/her own judgment.

In order to prevent breakage of the machine tool due to contact with the workpiece, as described above, various technologies have been proposed.

For example, a sensor for detecting contact between the workpiece and the tool is known, and this sensor is used to determine whether the tool and the workpiece come into contact.

On the other hand, in order to avoid a collision between the workpiece and the tool etc., a control method in which the tool is stopped before colliding with the workpiece is also known. When this control method is used, it is necessary to recognize, in advance, the size, the dimensions, and the shape of the workpiece and 3D data (3D-CAD data) of the workpiece shape, such as the position of the workpiece on the table.

However, 3D data of the workpiece shape before machining is not known in advance in many cases, and it is necessary to obtain it by measuring the workpiece or by another method.

To obtain 3D data of the workpiece shape, a method of measuring the workpiece in a non-contact manner is known. For example, a digitizer that produces digital data of a 3D object is known (for example, see NPL 1).

A technology for measuring a fine surface shape, such as machining marks (milling marks), by using a noncontact displacement gauge is also known (for example, see PTLs 2 and 3). This displacement gauge is attached to the ram, instead of a tool, and scans the workpiece, thereby making it possible to detect the shape of the workpiece with high accuracy.

To express the thus-acquired 3D data, a 3D bit map technique is known (for example, see PTL 4).

Furthermore, a technology in which a workpiece detection device, as described above, is automatically exchanged, like a tool, is also known (for example, see PTL 5).

CITATION LIST

Patent Literature

{PTL 1} Japanese Unexamined Patent Application, Publication No. 2007-048210
{PTL 2} Japanese Unexamined Patent Application, Publication No. 2004-012430
{PTL 3} Japanese Unexamined Patent Application, Publication No. 2004-012431
{PTL 4} PCT International Publication No. WO 02/023408 Pamphlet
{PTL 5} Japanese Unexamined Patent Application, Publication No. Hei-4-089513

Non Patent Literature

{NPL 1} "Regarding enhancement of products of 3-D digitizer 'Danae series'", lines 15 to 16, [online], Jun. 20, 2005 [searched on Jul. 3, 2008] Internet <URL:http://www.nec-eng.co.jp/press/050620press.html>

SUMMARY OF INVENTION

Technical Problem

The above-described method using the sensor for detecting contact between the workpiece and the tool has a problem in that the operation speed of the tool cannot be increased in order to avoid contact therebetween, which is inefficient. Furthermore, there is a problem in that, when the ram is brought into contact with the workpiece, it may not be possible to detect contact with the workpiece depending on the contact portion of the ram.

The above-described technology described in NPL 1 has a problem in that it is necessary to match the coordinate system when the workpiece is placed, which is troublesome for measurement. Furthermore, there is a problem in that an area where the shape of the workpiece cannot be measured by the sensor, that is to say, a blind area, remains. In addition, there is a problem of high price.

The above-described technologies described in PTLs 2 and 3 have a problem in that the acquired 3D-shape data is too detailed to use to avoid a collision between the workpiece and the tool. Since the motion axes of the machine tool are used to scan all surfaces of the workpiece with the sensor, the efficiency of acquisition of 3D data becomes worse. Since the sensor needs to perform scanning along the workpiece shape, there is a problem in that interference may occur between the workpiece and part of the machine tool, a cable of the sensor, etc. when 3D data is acquired.

The present invention has been made in order to solve the above-described problems, and an object thereof is to provide a workpiece measuring device, a collision preventing device, and a machine tool that are capable of easily acquiring 3D data of the shape of the workpiece used to prevent a collision between the workpiece and part of the machine tool.

Solution to Problem

In order to achieve the above-described object, the present invention provides the following means.

According to a first aspect, the present invention provides a workpiece measuring device, including: a measuring section that is attached to a main shaft to which a tool used for machining a workpiece serving as an object to be machined is attached and that measures the distance to the workpiece through scanning in a non-contact manner; and a shape recognition section that generates a 3D mesh structure formed by dividing a space into polyhedrons, that calculates the coordinates of a measurement point on the workpiece based on distance information about the measured distance to the workpiece, and that generates a measurement geometry map such that, when the ratio of the number of times the calculated measurement point is included in one unit of the 3D mesh structure to the number of times a position of the workpiece corresponding to the one unit is scanned is equal to or larger than a predetermined threshold, the one unit is regarded as part of the workpiece.

According to the above-described first aspect, the measurement geometry map of the workpiece is generated based on the ratio of the number of times the measurement point is included in one unit to the number of times scanning is performed; therefore, the accuracy of the measurement geometry map, which is 3D data, of the workpiece can be ensured.

Specifically, since the measurement geometry map of the workpiece is generated based on the ratio of the number of times the measurement point is included in one unit to the number of times scanning is performed, compared with a case where the measurement geometry map is generated based on distance information acquired through one scan, it is unlikely that the measurement geometry map is affected by the measurement precision of the measuring section and the distance from the measuring section to the workpiece, and the accuracy of the measurement geometry map can be easily ensured.

Furthermore, compared with a method in which the measuring section is replaced with another measuring section having different measurement precision, it is possible to easily adjust the accuracy of the measurement geometry map by adjusting the number of times scanning is performed, for measuring the distance to the workpiece, or the value of the threshold, which can be easily changed.

On the other hand, since the measuring section is attached to the main shaft, the accuracy of the measurement geometry map can be easily ensured, compared with a case where the measuring section is attached to another portion.

Specifically, since the measuring section is attached to the main shaft, which is controlled with high positional accuracy because it is used for machining the workpiece, the position where the measuring section is disposed is recognized with high accuracy. As a result, the position of the workpiece disposed with respect to the machine tool, having the main shaft, is also recognized with high accuracy, and the positional accuracy of the measurement geometry map with respect to the machine tool can be easily ensured.

In other words, since generation of the measurement geometry map and measurement of the position of the measurement geometry map disposed with respect to the machine tool are performed at the same time, compared with a method in which 3D design data of the workpiece is used as the measurement geometry map, it is not necessary to separately perform measurement of the position of the measurement geometry map disposed with respect to the machine tool, that is, calibration, and the measurement geometry map can be easily generated.

Since a plurality of positions from which the measuring section measures the distance to the workpiece can be set, areas on the workpiece whose distances from the measuring section have not been measured yet, that is, blind areas on the workpiece, which cannot be seen from the measuring section, can be prevented from remaining.

Since the measuring section is attached to the main shaft, as described above, even when a plurality of measurement positions are set and the measuring section is moved therebetween, the accuracy of the measurement geometry map is ensured. Furthermore, when the distance from the measuring section to the workpiece is measured at a plurality of positions, areas on the workpiece whose distances have not been measured yet can be prevented from remaining, and the entire workpiece can be measured.

Furthermore, since the distance from the measuring section attached to the main shaft to the workpiece is measured, the distances from the measuring section to the table, on which the workpiece is placed, and to the securing jigs, securing the workpiece on the table, for example, are measured at the same time. Thus, the measurement geometry map that includes the table and the securing jigs is generated. This measurement geometry map includes the table and the securing jigs, unlike a case where 3D design data of the workpiece is used as the measurement geometry map; therefore, the measurement geometry map is suitably used to prevent a collision between the workpiece and part of the machine tool, for example.

In the above-described first aspect, it is preferable that the size of one side of the one unit be set based on the distance between the workpiece and a point at which the tool and the main shaft approaching the workpiece starts machining the workpiece.

According to the above-described first aspect, the size of one side of the one unit of the 3D mesh structure is set based on the distance between the workpiece and a point at which the tool approaching the workpiece starts machining the workpiece. Therefore, it is possible to prevent contact between the workpiece and the tool etc. while the tool and the main shaft are being moved at high speed.

Specifically, the movements of the tool and the main shaft are controlled based on the measurement geometry map, thereby ensuring a clearance between the above-described machining starting point and the measurement geometry map.

Furthermore, since the size of one side of the one unit in the measurement geometry map is set based on the distance between the above-described machining starting point and the workpiece, a gap that is less than the above-described distance exists between the measurement geometry map and the workpiece. Thus, the actual distance between the machining starting point and the workpiece is the sum of the above-described clearance and the above-described gap, and contact between the workpiece and the tool etc. is prevented while the tool and the main shaft are being moved at high speed.

In the above-described first aspect, it is preferable that the measuring section include: a sensor head that measures the distance to the workpiece through scanning; a transmission section that transmits the distance information acquired through the measurement with the sensor head; a battery that supplies electric power to the sensor head and the transmission section; and a reception section that receives the distance information transmitted from the transmission section and that outputs the received distance information to the shape recognition section.

According to the above-described first aspect, the measuring section can measure the distance to the workpiece and output the distance information acquired through the measurement to the shape recognition section, without using wiring for supplying electric power and transmitting the distance information. Specifically, the sensor head measures the distance to the workpiece by using electric power supplied from the battery, and the transmission section transmits the distance information acquired through the measurement to the shape recognition section via the reception section; therefore, it is not necessary to use wiring for supplying electric power and transmitting the distance information.

Thus, it becomes easy to attach and detach the measuring section to and from the main shaft, and, for example, the measuring section can be exchanged by an automatic changer, such as an automatic tool changer.

Furthermore, since wiring etc. for connecting the measuring section to the shape recognition section is not required, interference between the workpiece and the wiring etc. can be prevented.

In the above-described first aspect, it is preferable that the measuring section include an attachment section that receives electric power supplied via the main shaft and that outputs the measurement information to the shape recognition section via the main shaft.

According to the above-described first aspect, the measuring section can measure the distance to the workpiece and output the distance information acquired through the measurement to the shape recognition section, without using wiring for supplying electric power and transmitting the distance information. Specifically, the measuring section measures the distance to the workpiece upon reception of electric power supplied via the main shaft and the attachment section, and the distance information acquired through the measurement is transmitted to the shape recognition section via the main shaft and the attachment section; therefore, it is not necessary to separately provide wiring for supplying electric power and transmitting the distance information.

Thus, since wiring etc. for connecting the measuring section to the shape recognition section is not required, interference between the workpiece and the wiring etc. can be prevented.

According to a second aspect, the present invention provides a collision preventing device including: a workpiece measuring device according to the above-described invention; a determination section that determines whether there will be interference between the measurement geometry map and at least one of the main shaft and the tool; and a control section that controls the movement of the main shaft based on a determination result from the determination section.

According to the second aspect of the present invention, a collision between the workpiece and at least one of the main shaft and the tool can be prevented based on the measurement geometry map generated by the workpiece measuring device of the above-described invention.

Specifically, by determining whether there will be interference between the measurement geometry map, which is larger than the workpiece, and the main shaft, a collision between the workpiece, which is smaller than the measurement geometry map, and the main shaft can be reliably prevented.

According to a third aspect, the present invention provides a machine tool including: a table on which a workpiece serving as an object to be machined is placed; a main shaft to which a tool used for machining the workpiece is attached; and a collision preventing device according to the above-described invention.

According to the above-described third aspect, it is possible to prevent a collision between the workpiece or the table and at least the main shaft and the tool based on the measurement geometry map generated by the workpiece measuring device of the above-described invention.

Specifically, by determining whether there will be interference between the measurement geometry map, which is larger than the workpiece and the table, and the main shaft, a collision between the workpiece and table, which are smaller than the measurement geometry map, and the main shaft can be reliably prevented.

Advantageous Effects of Invention

According to the workpiece measuring device, the collision preventing device, and the machine tool of the present invention, the measurement geometry map of the workpiece is generated based on the ratio of the number of times the measurement point is included in one unit to the number of times scanning is performed. Therefore, an advantage is afforded that 3D data of the shape of the workpiece used to prevent a collision between the workpiece and part of the machine tool can be easily acquired.

DESCRIPTION OF EMBODIMENTS

First Embodiment

A machine tool according to a first embodiment of the present invention will be described below with reference to FIGS. 1 to 5.

Figure 1:
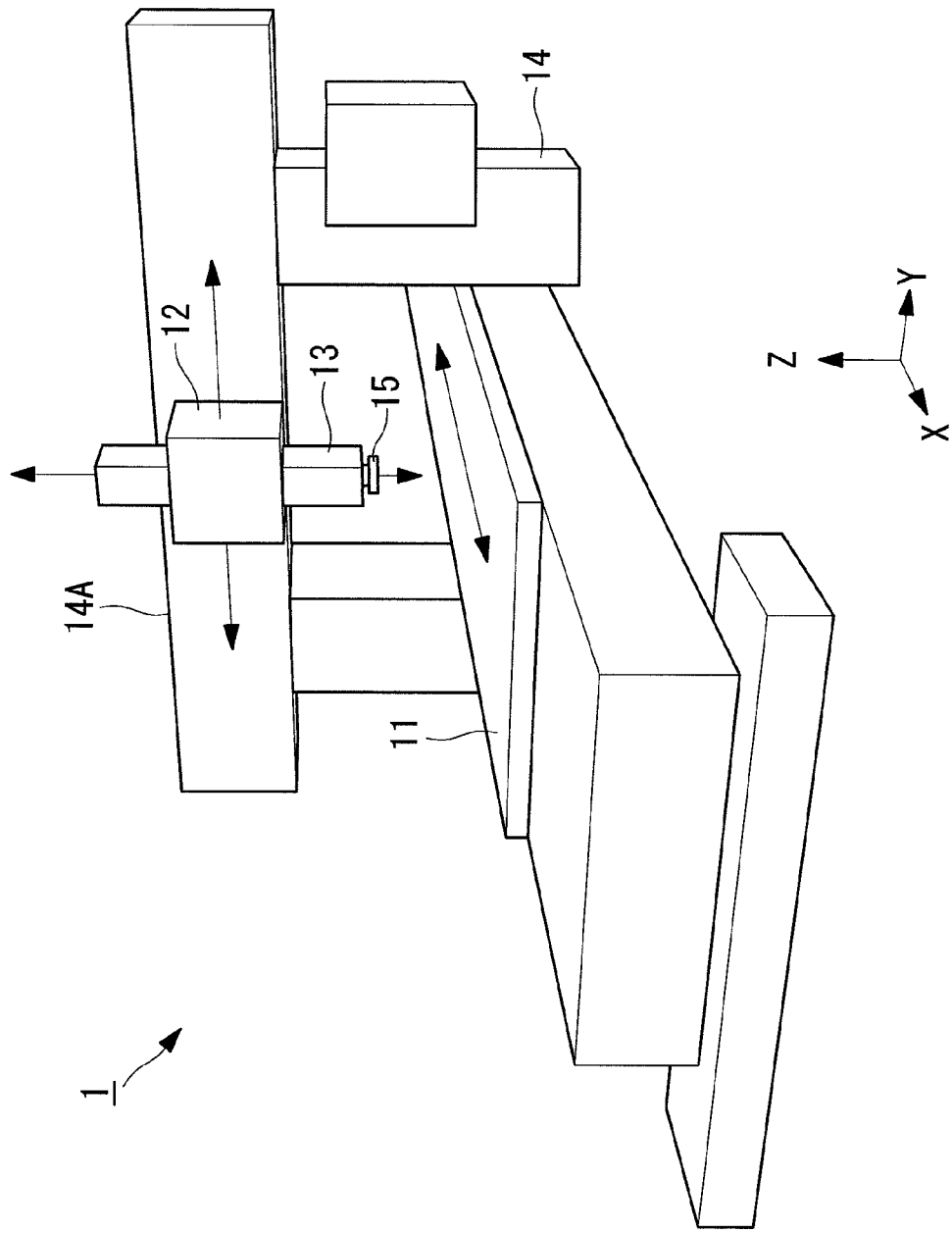
FIG. 1 is a schematic view for explaining the overall structure of a machine tool according to a first embodiment of the present invention.
Figure 2:
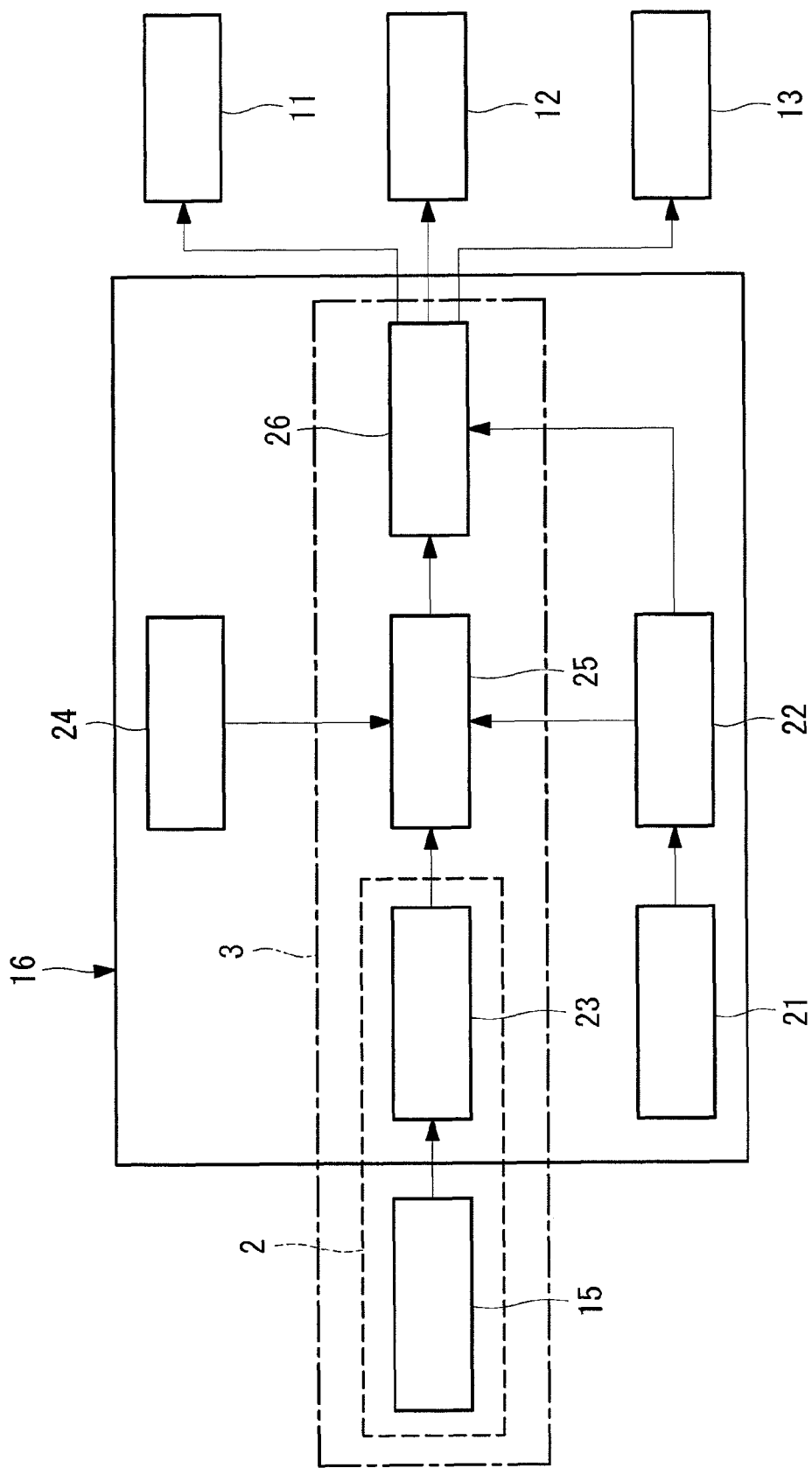
FIG. 2 is a block diagram for explaining a control section of the machine tool shown in FIG. 1.

FIG. 1 is a schematic view for explaining the overall structure of the machine tool according to this embodiment. FIG. 2 is a block diagram for explaining a control section of the machine tool shown in FIG. 1.

A machine tool 1 of this embodiment includes a workpiece measuring device 2 that generates a measurement geometry map MP based on a workpiece W and a collision preventing device 3 that prevents a collision between the workpiece W and a ram 13 of the machine tool 1 or a tool. The machine tool 1 is a five-face machining tool that machines the workpiece W, which is an object to be machined, from five directions, and its operation is controlled through numerical control (NC).

As shown in FIGS. 1 and 2, the machine tool 1 includes a table 11 that moves in an X-axis direction, a saddle 12 that moves in a Y-axis direction, the ram (main shaft) 13 that moves in a Z-axis direction, a measuring section 15 that is attached to the ram 13 to measure the distance to the workpiece W, and a machine-tool control section 16 that performs NC for the movements of the table 11, the saddle 12, and the ram 13.

The table 11 is a platform on which the workpiece W is secured, and is disposed so as to be able to move in the X-axis direction, as shown in FIG. 1. As shown in FIG. 2, the movement of the table 11 in the X-axis direction is controlled by a movement control section 26 of the machine-tool control section 16.

As shown in FIG. 1, the saddle 12 is provided with the ram 13 and is disposed on a beam portion 14A that extends along the Y-axis direction on supporting sections 14 that are formed in a gate-like shape and are disposed across the table 11. The saddle 12 can move in the Y-axis direction. As shown in FIG. 2, the movement of the saddle 12 in the Y-axis direction is controlled by the movement control section 26.

As shown in FIG. 1, the measuring section 15 is attached to an end of the ram 13 closer to the table 11 when the shape of the workpiece W is measured, and the tool is attached to the end of the ram 13 when the workpiece W is cut. Furthermore, the ram 13 is disposed passing through the saddle 12 and can move in the Z-axis direction. As shown in FIG. 2, the movement of the ram 13 in the Z-axis direction is controlled by the movement control section 26.

Figure 3:
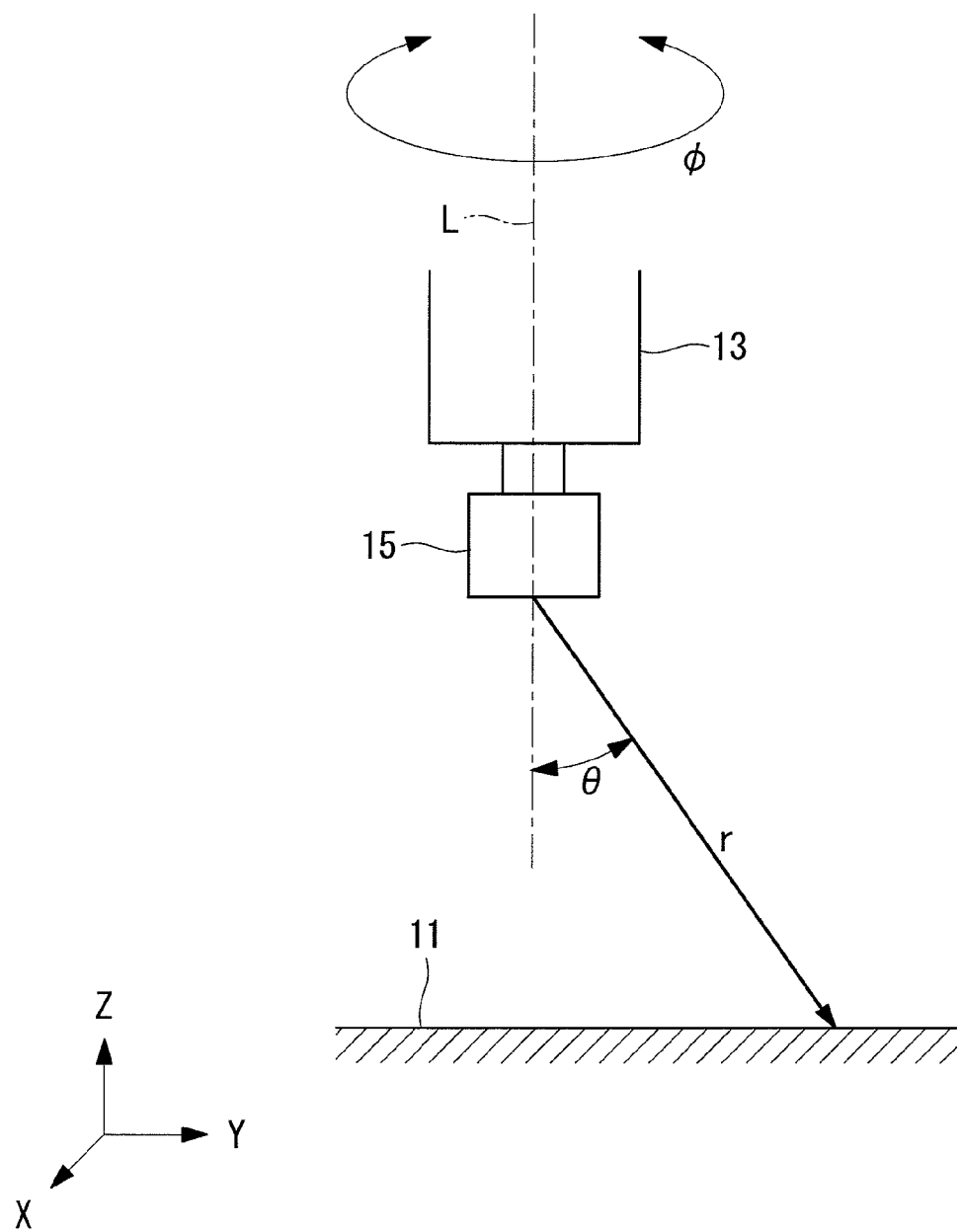
FIG. 3 is a partially enlarged view for explaining the structure of a measuring section and a ram shown in FIG. 1.

FIG. 3 is a partially enlarged view for explaining the structure of the measuring section and the ram shown in FIG. 1.

The measuring section 15 is a laser distance sensor used to generate the measurement geometry map MP of the workpiece W. As shown in FIGS. 1 and 3, the measuring section 15 is attached to the end of the ram 13 closer to the table 11.

As shown in FIG. 3, the measuring section 15 changes an emission angle θ of a laser beam used for distance measurement, to perform 2D scanning (scanning). Furthermore, the measuring section 15 performs 3D scanning while the ram 13 is rotated about the central axis line L.

Distance information about the distance from the workpiece W or the table 11 to the measuring section 15 measured by the measuring section 15 is input to a shape recognition section 23, as shown in FIG. 2.

The machine-tool control section 16 generates the measurement geometry map MP of the workpiece W before the workpiece W is cut, prevents a collision between the ram 13 or the tool and the workpiece W based on the generated measurement geometry map MP when an NC program that describes the movement of the tool used for cutting the workpiece W is debugged, and controls the movements of the table 11, the saddle 12, and the ram 13 when the workpiece W is cut.

As shown in FIG. 2, the machine-tool control section 16 includes a program storage section 21 and a program interpretation section 22 that generate a signal for controlling the movement of the tool when the workpiece W is machined, the shape recognition section 23 that generates the measurement geometry map MP of the workpiece W, a shape storage section 24 that stores the shape of a tool attached to the main shaft, an interference determination section (determination section) 25, and the movement control section (control section) 26, which controls the movements of the table 11, the saddle 12, and the ram 13.

Here, the workpiece measuring device 2 is constituted by the measuring section 15 and the shape recognition section 23, and the collision preventing device 3 is constituted by the workpiece measuring device 2, the interference determination section 25, and the movement control section 26.

The program storage section 21 stores the NC program that describes the movement pathway of the tool used to cut the workpiece W.

As shown in FIG. 2, the program storage section 21 is connected to the program interpretation section 22, and the NC program stored in the program storage section 21 is output to the program interpretation section 22.

The program interpretation section 22 generates information about the movement distance and the movement speed of the tool based on the NC program.

As shown in FIG. 2, the program interpretation section 22 is connected to the interference determination section 25 and the movement control section 26, and the information about the movement distance etc. of the tool etc. generated by the program interpretation section 22 is output to the interference determination section 25 and the movement control section 26.

The shape recognition section 23 generates the measurement geometry map MP used to prevent a collision between the ram 13 or the tool and the workpiece W when the NC program is debugged.

As shown in FIG. 2, the shape recognition section 23 is connected to the measuring section 15 and the interference determination section 25. The shape recognition section 23 receives the distance information acquired through the measurement with the measuring section 15 and outputs information of the measurement geometry map MP to the interference determination section 25.

Note that a method of generating the measurement geometry map MP in the shape recognition section 23 will be described later.

The shape storage section 24 stores the shapes of the ram 13 and the tool attached to the ram 13, which potentially collide with the workpiece W when coming close thereto.

As shown in FIG. 2, the shape storage section 24 is connected to the interference determination section 25. The shapes of the ram 13 etc. stored in the shape storage section 24 are output to the interference determination section 25.

The interference determination section 25 determines interference between the measurement geometry map MP and the ram 13 etc. when the NC program is debugged, to prevent a collision between the ram 13 or the tool and the workpiece W.

As shown in FIG. 2, the interference determination section 25 is connected to the shape recognition section 23, the shape storage section 24, the program interpretation section 22, and the movement control section 26. The interference determination section 25 receives the measurement geometry map MP from the shape recognition section 23, receives the shapes of the ram 13 etc. from the shape storage section 24, and receives information about the movement distance etc. of the tool etc. from the program interpretation section 22. On the other hand, the interference determination result obtained in the interference determination section 25 is output to the movement control section 26.

The movement control section 26 controls the movements of the table 11, the saddle 12, and the ram 13, thereby controlling the movement distance and the movement speed of the tool attached to the end of the ram 13. Furthermore, if it is judged that the measurement geometry map MP and the ram 13 will interfere when the NC program is debugged, the movement control section 26 stops the movements of the table 11, the saddle 12, and the ram 13.

As shown in FIG. 2, the movement control section 26 is connected to the program interpretation section 22 and the interference determination section 25. The movement control section 26 receives the information about the movement distance etc. of the tool etc. from the program interpretation section 22 and receives the determination result concerning interference between the measurement geometry map MP and the ram 13 etc. from the interference determination section 25. On the other hand, control signals for controlling the movements of the table 11, the saddle 12, and the ram 13 generated by the movement control section 26 are output to the table 11, the saddle 12, and the ram 13.

Next, the method for machining the workpiece W with the machine tool 1, having the above-described configuration, will be described.

Figure 5:
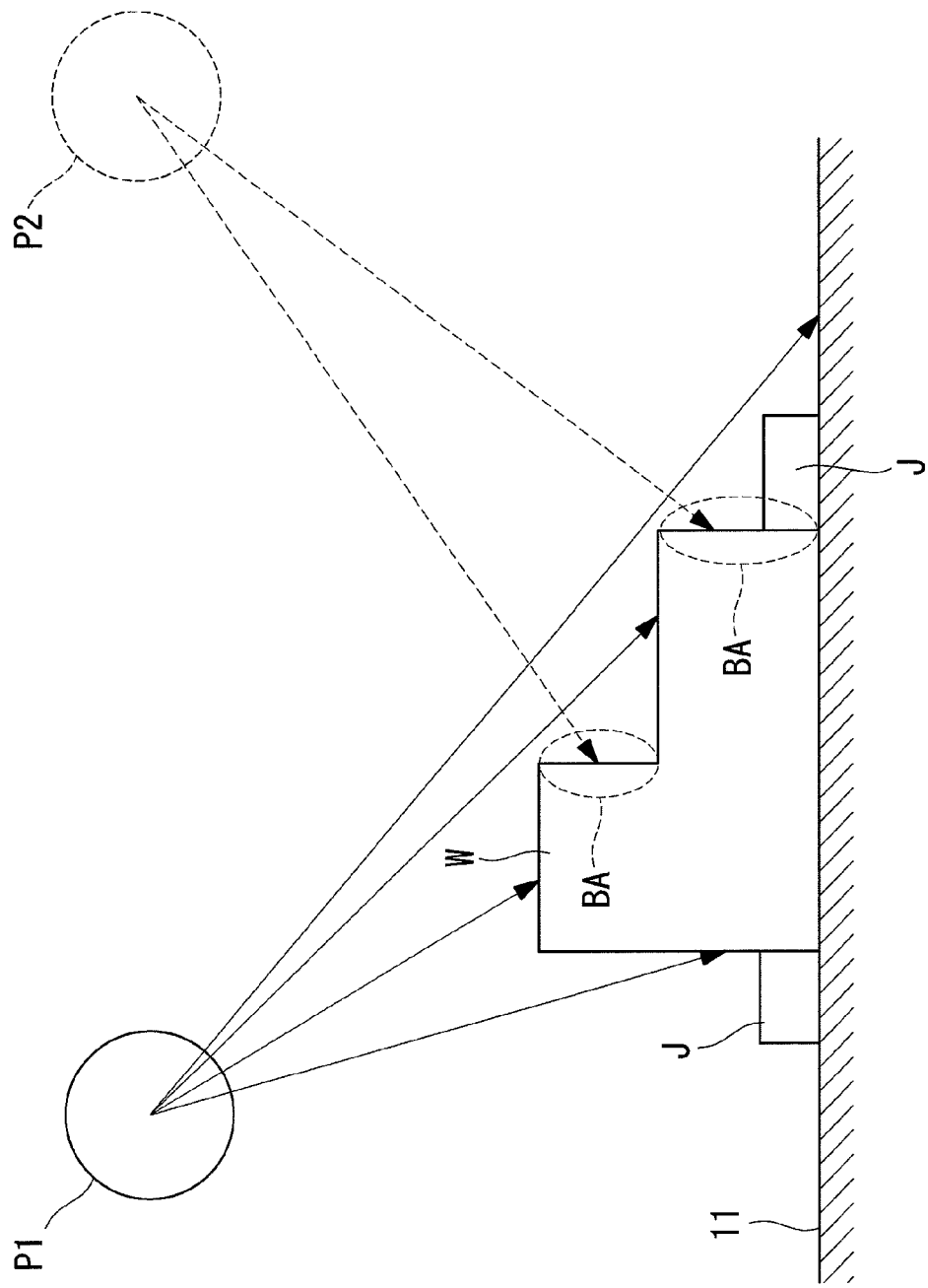
FIG. 5 is a schematic view for explaining measurement of the distance from the measuring section to a workpiece.

To machine the workpiece W with the machine tool 1, the workpiece W is first secured on the table 11 by using securing jigs J (see FIG. 5).

Then, as shown in FIG. 2, the NC program is output from the program storage section 21 to the program interpretation section 22 in units of blocks (in units of movements, for example, in units of movement lines).

The program interpretation section 22 generates information about the movement distance and the movement speed of the tool from the NC program and outputs the information to the movement control section 26. The movement control section 26 separates the received information into the movement distance and the movement speed for each of the table 11, the saddle 12, and the ram 13 and outputs a control signal for controlling the movement distance and the movement speed of each of the table 11, the saddle 12, and the ram 13.

When the control signal is received from the movement control section 26, each of the table 11, the saddle 12, and the ram 13 is driven by its own motor based on the received control signal, thereby machining the workpiece W.

Next, a description will be given of the method for generating the measurement geometry map MP of the workpiece W and a method for preventing a collision between the workpiece W and part of the machine tool 1 by using the generated measurement geometry map MP, which are features of this embodiment.

The generation of the measurement geometry map MP of the workpiece W and the collision prevention control, described here, are performed, for example, when the NC program is debugged before the above-described machining of the workpiece W, specifically, when it is determined whether there is interference between the workpiece W and the ram 13 or the tool.

Figure 4:
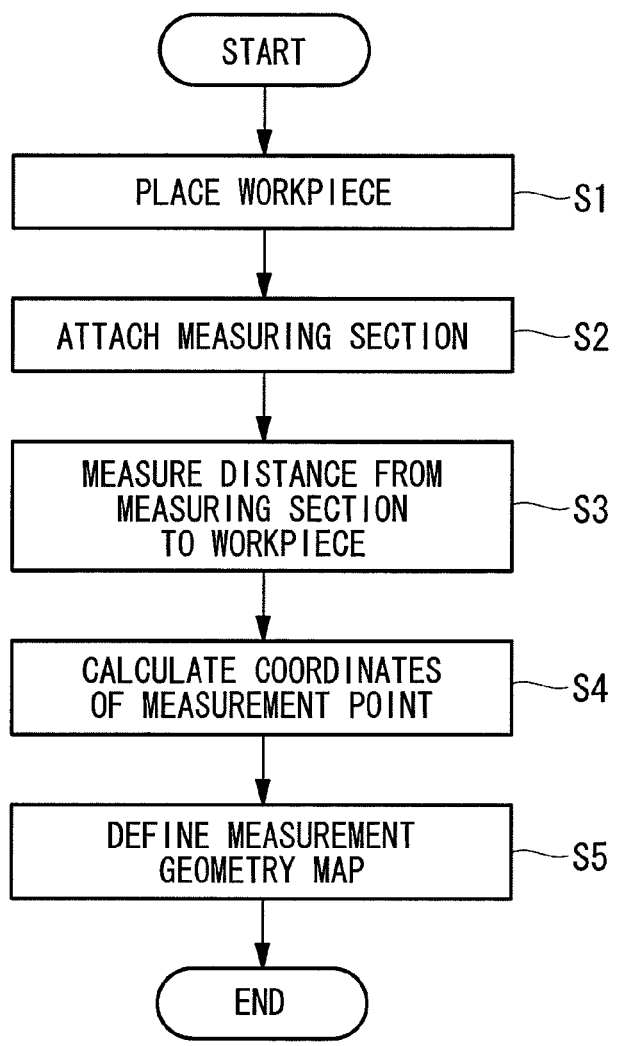
FIG. 4 is a flowchart for explaining a method of generating a measurement geometry map.

FIG. 4 is a flowchart for explaining the measurement-geometry-map generation method. FIG. 5 is a schematic view for explaining measurement of the distance from the measuring section to the workpiece.

As shown in FIG. 5, first, the workpiece W is placed on the table 11 (Step S1). At this time, the workpiece W is secured on the table 11 with the securing jigs J.

Then, as shown in FIG. 3, the measuring section 15 is attached to the end of the ram 13 (Step S2). The measuring section 15 and the shape recognition section 23 of the machine-tool control section 16 are connected to each other with a cable, for example, such that electric power can be supplied to the measuring section 15 and distance information acquired through the measurement with the measuring section 15 can be input to the shape recognition section 23 (see FIG. 2).

After the measuring section 15 is attached to the ram 13, the measuring section 15 is moved to a first measurement position P1 and measures the distance from the measuring section 15 to the workpiece W, as shown in FIG. 5 (Step S3).

The measuring section 15 emits a laser beam while changing the scanning angle θ, as shown in FIG. 3, and measures a distance r from the measuring section 15 to the workpiece W. In other words, 2D scanning is performed. At the same time, the distance from the measuring section 15 to the table 11 and the distances from the measuring section 15 to the securing jigs J are also measured. Furthermore, the ram 13 is rotated about the central axis line L, the scanning direction of the laser beam from the measuring section 15 is changed, and 2D scanning is performed again. Thus, 3D scanning of the workpiece W is performed.

After 3D scanning is completed at the first measurement position P1, the measuring section 15 is next moved to a second measurement position P2, and 3D scanning of the workpiece W is performed again. The second measurement position P2 is a position from which it is possible to measure blind areas BA that remain when the measuring section 15 performs 3D scanning of the workpiece W from the first measurement position P1, in other words, areas whose distances from the measuring section 15 have not been measured yet.

As such measurement positions, for example, five positions can be set: the upper side of the workpiece W (Z-axis positive direction), the front side thereof (X-axis positive direction), the rear side thereof (X-axis negative direction), and both lateral sides thereof (Y-axis positive direction and Y-axis negative direction). Note that the number of measurement positions and the locations thereof are changed depending on the position where the workpiece W is disposed, the shape thereof, and the reflectance of the laser beam emitted from the measuring section 15; therefore, they are not particularly limited.

As shown in FIG. 2, the distance r measured by the measuring section 15 and the scanning angle θ are input to the shape recognition section 23. Furthermore, the position (Xr, Yr, Zr) of the ram 13 and the angle φ of rotation of the ram 13 when the distance r is measured are also input to the shape recognition section 23.

Based on these pieces of received information, the shape recognition section 23 calculates the coordinates (Xm, Ym, Zm) of the measurement point on the workpiece W obtained when the distance r is measured, based on the following calculation formulae (Step S4).

$$Xm = Xr + r \cdot \sin \theta$$

$$Ym = Yr + r \cdot \sin \phi$$

$$Zm = Zr - r \cdot \cos \phi \cdot \cos \theta$$

Figure 6:
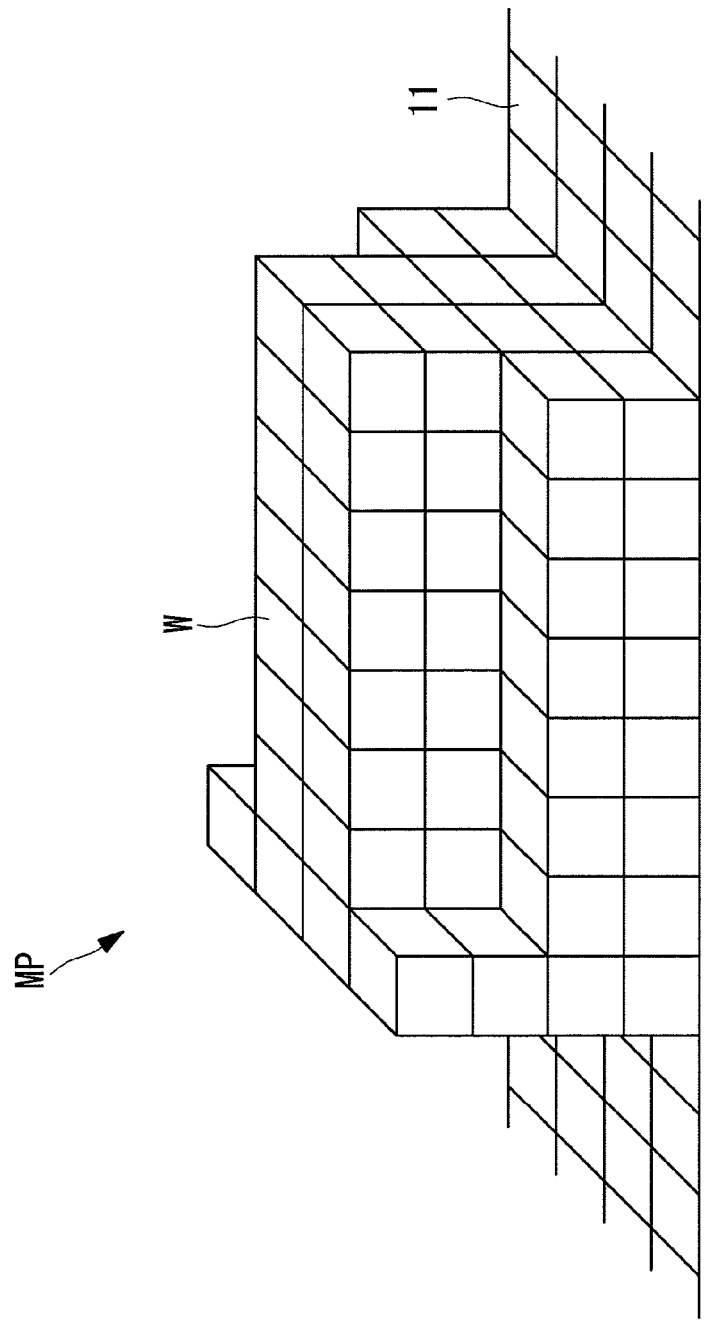
FIG. 6 is a view for explaining the shape of the measurement geometry map defined by a shape recognition section.

FIG. 6 is a view for explaining the shape of the measurement geometry map defined by the shape recognition section.

The shape recognition section 23 divides the measured space into hexahedron-like 3D mesh regions, in other words, generates a 3D mesh structure, tallies one unit of the 3D mesh structure (hereinafter, referred to as a "voxel") that includes the above-described coordinates (Xm, Ym, Zm) of the measurement point, and defines the measurement geometry map MP (Step S5).

Specifically, each time the measuring section 15 performs 2D scanning, the shape recognition section 23 tallies the voxel that includes the coordinates of the measurement point, for example, registers "1". This processing is performed each time 2D scanning is performed.

As a result, each voxel is tallied the number of times 2D scanning is performed at most and is not tallied at all at least.

The shape recognition section 23 determines whether the workpiece W is included in each voxel according to the tally with respect to the total number of times 2D scanning is performed. Specifically, if the ratio of the tally to the total number of times 2D scanning is performed is larger than a predetermined threshold, it is determined that the workpiece W is included in the voxel. If the ratio is smaller than the predetermined threshold, it is determined that the workpiece W is not included in the voxel.

Note that the value of the predetermined threshold is changed depending on the measurement precision of the measuring section 15 and the reflectance of the workpiece W; therefore, it is not particularly limited.

On the other hand, the size of one side of the above-described voxel is set based on the distance between the workpiece W and a portion of the machine tool 1, such as the tool or the ram 13, obtained when an approach mode, in which the tool approaches the workpiece W, is changed to a machining mode, in which the workpiece W is cut with the tool, at the time of machining with the machine tool 1.

This distance is set by comprehensively taking into account the performance and the intended purpose of the machine tool 1, the specifications of the workpiece, the workability of an operator, the measurement processing speed, and other factors. Thus, the size of one side of the voxel can be set to a value from about 1 mm to about 40 mm, for example; however, the size varies when the above-described factors are taken into account and is not particularly limited.

After the shape recognition section 23 generates the measurement geometry map MP, debugging of the NC program is performed next.

First, a tool, such as an end mill, used for machining the workpiece W is attached to the end of the ram 13.

Then, as shown in FIG. 2, under the instruction of the operator, the NC program is output from the program storage section 21 to the program interpretation section 22 for each block, and information about the movement distance etc. of the tool etc. is output from the program interpretation section 22 to the interference determination section 25.

The interference determination section 25 determines whether interference will occur based on the received information about the movement distance etc. of the tool etc., the measurement geometry map MP received from the shape recognition section 23, and the shapes of the tool and the ram 13 received from the shape storage section 24.

The shapes of the tool and the ram 13 input to the interference determination section 25 are stored in advance in the shape storage section 24 and are the shapes of the ram 13 and the tool attached to the machine tool 1 while the debugging work is performed.

The interference determination section 25 determines whether the tool or the ram 13 interferes with the measurement geometry map MP when the tool and the ram 13 are moved, based on the information about the movement distance etc. of the tool etc., and outputs the determination result to the movement control section 26.

If the interference determination section 25 determines that the interference will occur, the movement control section 26 stops executing the NC program that will cause interference, thereby preventing a collision between the tool or the ram 13 and the workpiece W.

On the other hand, if the interference determination section 25 determines that interference will not occur, the movement control section 26 outputs control signals to the table 11, the saddle 12, and the ram 13 based on the received information about the movement distance etc. of the tool etc.

According to the above-described configuration, the measurement geometry map MP of the workpiece W is generated based on the ratio of the number of times a measurement point is included in each voxel to the number of times 2D scanning is performed; therefore, the accuracy of the measurement geometry map MP, which is 3D data, of the workpiece W can be ensured. Thus, it is possible to easily acquire 3D data of the shape of the workpiece W, which is used to prevent a collision between the workpiece W and the ram 13 etc. of the machine tool 1.

Specifically, since the measurement geometry map MP of the workpiece W is generated based on the ratio of the number of times a measurement point is included in the voxel to the number of times 2D scanning is performed, compared with a case where the measurement geometry map MP is generated based on distance information acquired through one scan, it is unlikely that the measurement geometry map MP is affected by the measurement precision of the measuring section 15 and the distance r from the measuring section 15 to the workpiece W, and the accuracy of the measurement geometry map MP can be ensured.

Furthermore, compared with a method in which the measuring section 15 is replaced with another measuring section 15 having different measurement precision, it is possible to easily adjust the accuracy of the measurement geometry map MP by adjusting the number of times 2D scanning is performed or the value of the threshold, which can be easily changed.

On the other hand, since the measuring section 15 is attached to the ram 13, the accuracy of the measurement geometry map MP can be easily ensured, compared with a case where the measuring section 15 is attached to another portion.

Specifically, since the measuring section 15 is attached to the ram 13, which is controlled with high positional accuracy because it is used for machining the workpiece W, the position where the measuring section 15 is disposed is recognized with high accuracy. As a result, the position of the workpiece W disposed with respect to the machine tool 1, having the ram 13, is also recognized with high accuracy, and the positional accuracy of the measurement geometry map MP with respect to the machine tool 1 can be easily ensured.

In other words, since generation of the measurement geometry map MP and measurement of the position of the measurement geometry map MP disposed with respect to the machine tool 1 are performed at the same time, compared with a method in which 3D design data of the workpiece W is used as the measurement geometry map MP, it is not necessary to separately perform measurement of the position of the measurement geometry map MP disposed with respect to the machine tool 1, that is, calibration, and the measurement geometry map MP can be easily generated.

Since a plurality of positions from which the measuring section 15 measures the distance r to the workpiece W are set, areas on the workpiece W whose distances from the measuring section 15 have not been measured yet, that is, the blind areas BA on the workpiece W, which cannot be seen from the measuring section, can be prevented from remaining.

Since the measuring section 15 is attached to the ram 13, even when a plurality of measurement positions are set and the measuring section 15 is moved therebetween, the accuracy of the measurement geometry map MP is ensured. Furthermore, when the distance r from the measuring section 15 to the workpiece W is measured at a plurality of positions P1 and P2, the blind areas BA on the workpiece W are prevented from remaining, and the entire workpiece W can be measured.

Furthermore, since the distance r from the measuring section 15 attached to the ram 13 to the workpiece W is measured, the distances from the measuring section 15 to the table 11, on which the workpiece W is placed, and to the securing jigs J, securing the workpiece W on the table, are measured at the same time. Thus, the measurement geometry map MP that includes the table 11 and the securing jigs J is generated. This measurement geometry map MP includes the table 11 and the securing jigs J, unlike a case where 3D design data of the workpiece W is used as the measurement geometry map MP; therefore, the measurement geometry map MP is suitably used to prevent a collision between the workpiece W and the ram 13 etc. of the machine tool 1.

The size of one side of the voxel is set based on the distance between the workpiece W and a point at which the tool approaching the workpiece W starts machining the workpiece W. Therefore, it is possible to prevent contact between the workpiece W and the tool etc. while the tool and the ram 13 are being moved at high speed.

Specifically, the movements of the tool and the ram 13 are controlled based on the measurement geometry map MP, thereby ensuring a clearance between the above-described machining starting point and the measurement geometry map MP.

Furthermore, since the size of one side of the voxel in the measurement geometry map MP is set based on the distance between the above-described machining starting point and the workpiece W, a gap that is less than the above-described distance exists between the measurement geometry map MP and the workpiece W. Thus, the actual distance between the machining starting point and the workpiece W is the sum of the above-described clearance and the above-described gap, and contact between the workpiece W and the tool etc. can be prevented while the tool and the ram 13 are being moved at high speed.

Second Embodiment

Next, a second embodiment of the present invention will be described with reference to FIGS. 7 to 9.

Although the basic configuration of a machine tool according to this embodiment is the same as that of the first embodiment, this embodiment differs from the first embodiment in the configurations of the measuring section and the machine-tool control section. Therefore, in this embodiment, only the vicinities of the measuring section and the machine-tool control section will be described with reference to FIGS. 7 to 9, and a description of identical components will be omitted.

Figure 7:
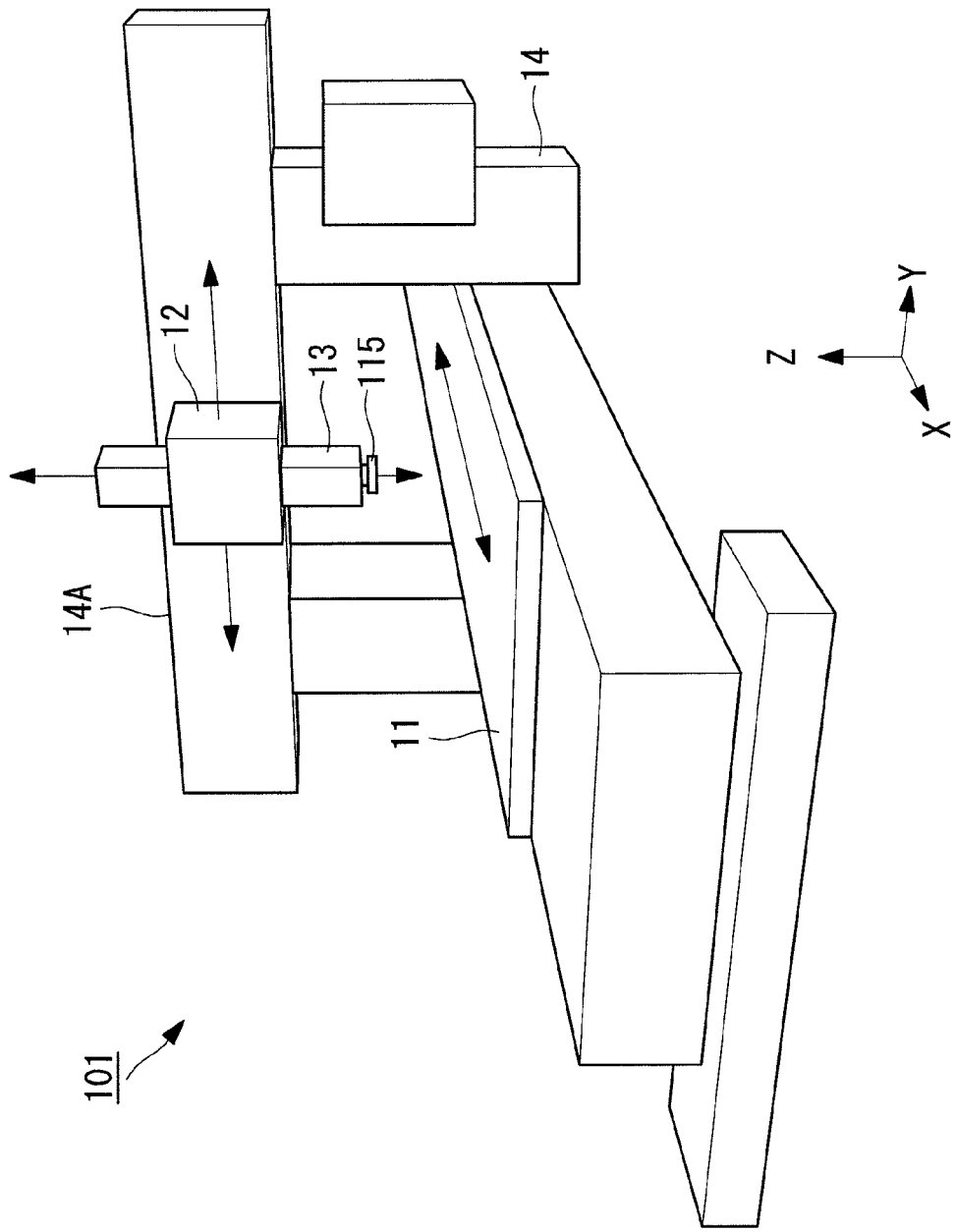
FIG. 7 is an overall view for explaining the structure of a machine tool according to a second embodiment of the present invention.

FIG. 7 is an overall view for explaining the structure of the machine tool according to this embodiment. FIG. 8 is a block diagram for explaining the configuration of the measuring section shown in FIG. 7.

Note that the same symbols are assigned to the components that are identical to those of the first embodiment, and a description thereof will be omitted.

Figure 8:
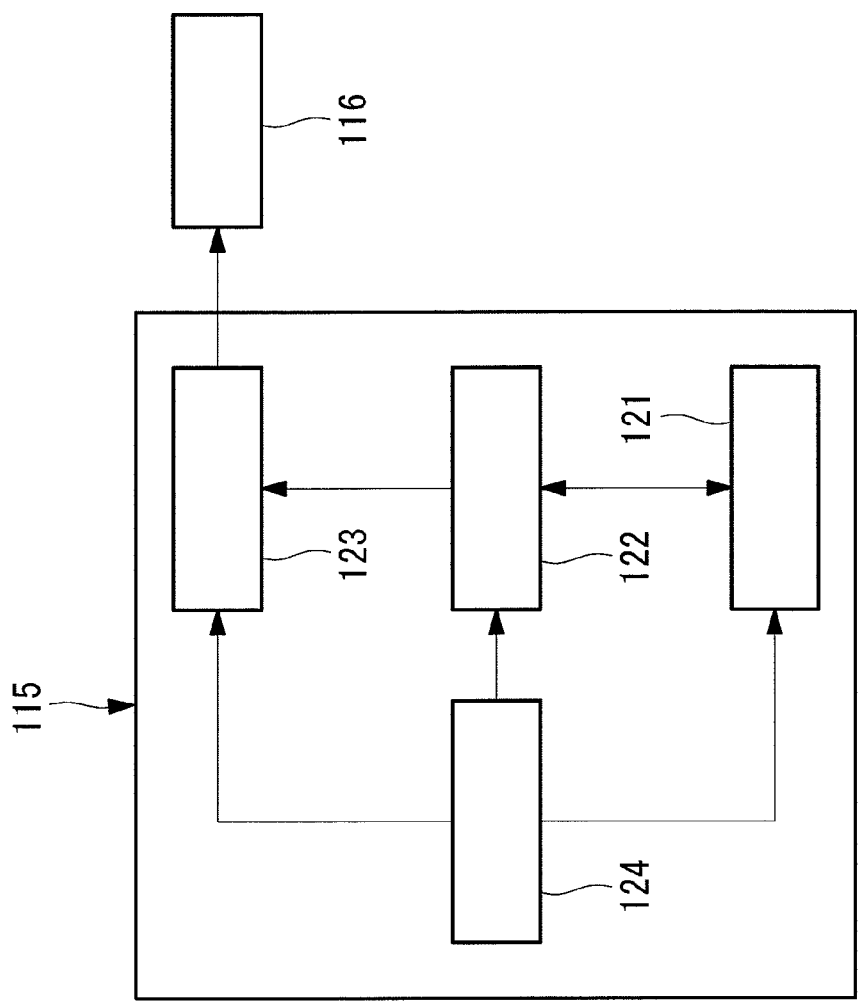
FIG. 8 is a block diagram for explaining the configuration of a measuring section shown in FIG. 7.

As shown in FIGS. 7 and 8, a machine tool 101 includes the table 11, which moves in the X-axis direction, the saddle 12, which moves in the Y-axis direction, the ram 13, which moves in the Z-axis direction, a measuring section 115 that is attached to the ram 13 to measure the distance to the workpiece W, and a machine-tool control section 116 that performs NC for the movements of the table 11, the saddle 12, and the ram 13.

The measuring section 115 is a laser distance sensor used to generate the measurement geometry map MP of the workpiece W. As shown in FIG. 7, the measuring section 115 is attached to an end of the ram 13 closer to the table 11.

Furthermore, the measuring section 115 is attached to and detached from the end of the ram 13 by an automatic tool changer of the machine tool 101, like the tool etc. used for machining the workpiece W.

As shown in FIG. 8, the measuring section 115 includes a sensor head 121, a sensor control section 122, a transmission section 123, and a battery 124.

The sensor head 121 changes the emission angle θ of a laser beam used for distance measurement and performs 2D scanning (scanning).

As shown in FIG. 8, the sensor head 121 is connected to the sensor control section 122 and the battery 124. The sensor head 121 receives a control signal from the sensor control section 122 and receives electric power supplied from the battery 124. On the other hand, distance information acquired through the measurement with the sensor head 121 is output to the sensor control section 122.

The sensor control section 122 controls emission of a laser beam from the sensor head 121 and the scanning angle θ thereof.

As shown in FIG. 8, the sensor control section 122 is connected to the sensor head 121, the transmission section 123, and the battery 124. The sensor control section 122 receives the distance information acquired through the measurement with the sensor head 121 and receives electric power supplied from the battery 124. On the other hand, the sensor control section 122 outputs a control signal to the sensor head 121 and also outputs the distance information to the transmission section 123.

The transmission section 123 transmits the distance information acquired through the measurement with the sensor head 121 to a reception section 131 of the machine-tool control section 116 wirelessly.

As shown in FIG. 8, the transmission section 123 is connected to the sensor control section 122 and the battery 124. The transmission section 123 receives the distance information from the sensor control section 122 and receives electric power supplied from the battery 124. The distance information received by the transmission section 123 is transmitted to the reception section 131 wirelessly.

The battery 124 supplies electric power to the sensor head 121, the sensor control section 122, and the transmission section 123. As shown in FIG. 8, the battery 124 is connected to the sensor head 121, the sensor control section 122, and the transmission section 123 so as to be able to supply electric power thereto.

The machine-tool control section 116 generates the measurement geometry map MP of the workpiece W before the workpiece W is cut, prevents a collision between the ram 13 or the tool and the workpiece W based on the generated measurement geometry map MP when the NC program, which describes the movement of the tool used for cutting the workpiece W, is debugged, and controls the movements of the table 11, the saddle 12, and the ram 13 when the workpiece W is cut.

Figure 9:
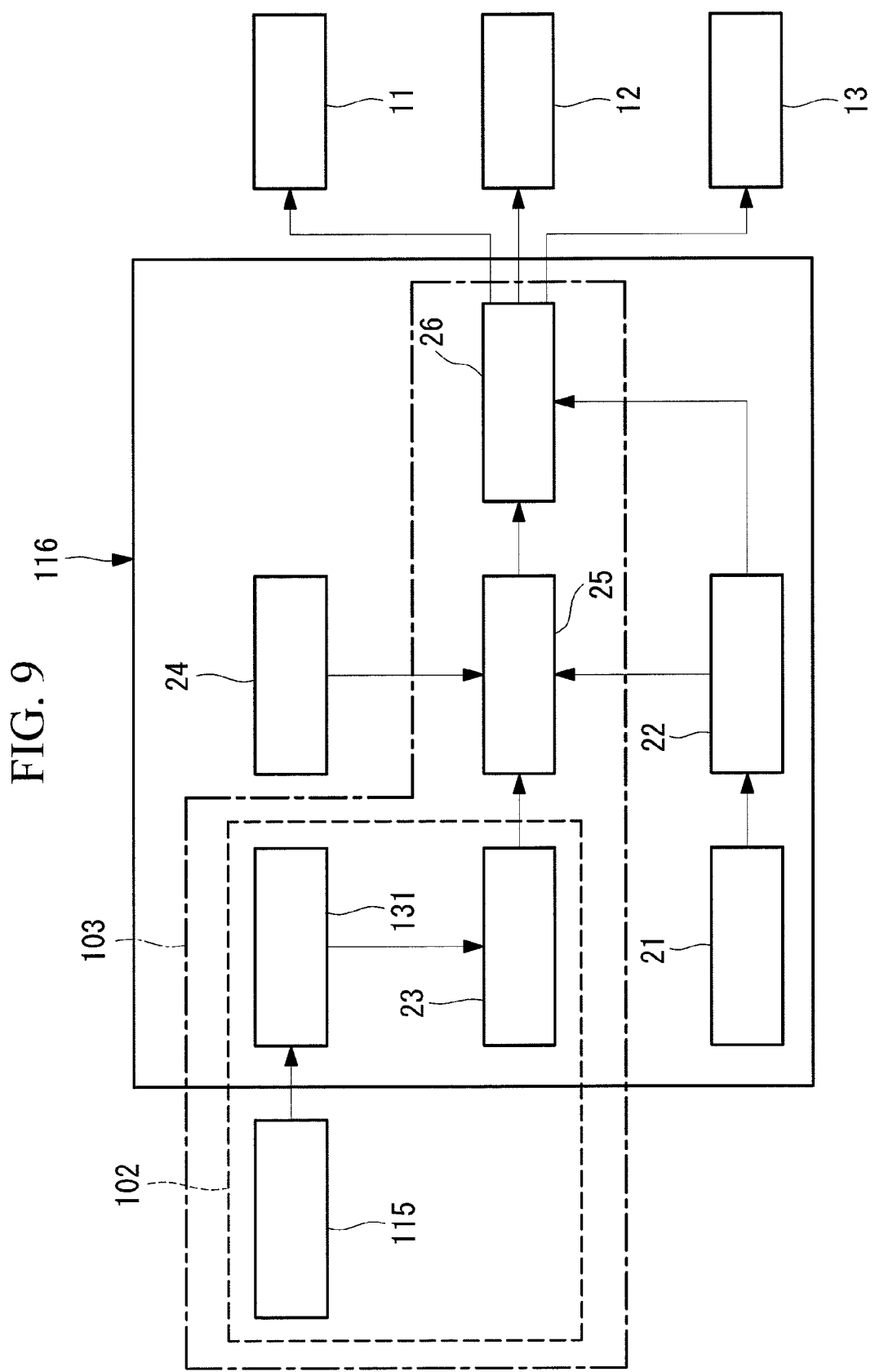
FIG. 9 is a block diagram for explaining the configuration of a machine-tool control section shown in FIG. 8.

FIG. 9 is a block diagram for explaining the configuration of the machine-tool control section shown in FIG. 8.

As shown in FIG. 9, the machine-tool control section 116 includes the reception section 131, which receives the distance information transmitted from the measuring section 115, the program storage section 21, the program interpretation section 22, the shape recognition section 23, the shape storage section 24, the interference determination section 25, and the movement control section 26.

The reception section 131 receives the distance information transmitted wirelessly from the transmission section 123 of the measuring section 115.

As shown in FIG. 9, the reception section 131 is connected to the shape recognition section 23 and outputs the received distance information to the shape recognition section 23.

Next, the operations of the transmission section 123 and the machine-tool control section 116 of this embodiment will be described.

The measuring section 115 of this embodiment is automatically attached to and detached from the ram 13 by the automatic tool changer, like the tool used for machining the workpiece W.

To measure the distance from the measuring section 115 to the workpiece W, a control signal is output from the sensor control section 122 to the sensor head 121, and a measurement laser beam is emitted from the sensor head 121. The distance information acquired through the measurement with the sensor head 121 is output from the sensor head 121 to the sensor control section 122 and is output from the sensor control section 122 to the transmission section 123.

As shown in FIGS. 8 and 9, the transmission section 123 transmits the received distance information to the machine-tool control section 116 wirelessly. The distance information transmitted wirelessly is received by the reception section 131 and is output from the reception section 131 to the shape recognition section 23.

The subsequent operation is the same as that of the first embodiment, and a description thereof will be omitted.

According to the above-described configuration, the measuring section 115 can measure the distance to the workpiece W and output the distance information acquired through the measurement to the shape recognition section 23, without using wiring for supplying electric power and transmitting the distance information. Specifically, the sensor head 121 measures the distance to the workpiece W by using electric power supplied from the battery 124, and the transmission section 123 transmits the distance information acquired through the measurement to the shape recognition section via the reception section 131; therefore, it is not necessary to use wiring for supplying electric power and transmitting the distance information.

Thus, it becomes easy to attach and detach the measuring section 115 to and from the ram 13, and, for example, the measuring section 115 can be exchanged by an automatic changer, such as the automatic tool changer.

Furthermore, since wiring etc. for connecting the measuring section 115 to the shape recognition section 23 is not required, interference between the workpiece W and the wiring etc. can be prevented.

Third Embodiment

Next, a third embodiment of the present invention will be described with reference to FIG. 10.

Although the basic configuration of a machine tool according to this embodiment is the same as that of the first embodiment, this embodiment differs from the first embodiment in the attachment method for the ram and the measuring section. Therefore, in this embodiment, only the vicinities of the ram and the measuring section will be described with reference to FIG. 10, and a description of identical components will be omitted.

Figure 10:
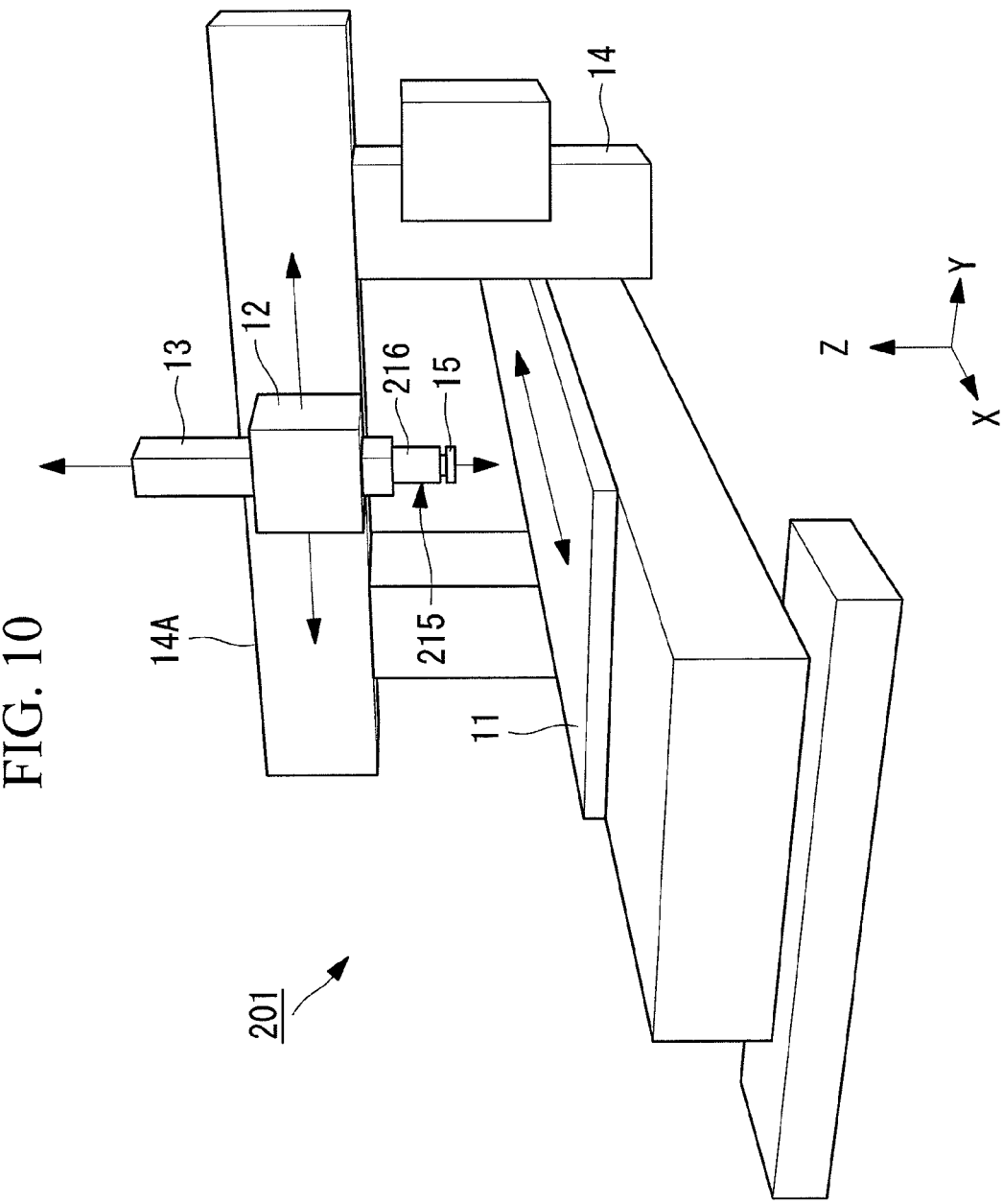
FIG. 10 is an overall view for explaining the structure of a machine tool according to a third embodiment of the present invention.

FIG. 10 is an overall view for explaining the structure of a machine tool according to this embodiment.

Note that the same symbols are assigned to the components that are identical to those of the first embodiment, and a description thereof will be omitted.

As shown in FIG. 10, a machine tool 201 includes the table 11, which moves in the X-axis direction, the saddle 12, which moves in the Y-axis direction, the ram 13, which moves in the Z-axis direction, and a measurement unit 215 that is attached to the ram 13.

The measurement unit 215 includes the measuring section 15, which measures the distance to the workpiece W, and an attachment section 216 that is attached to the ram 13.

The attachment section 216 is an attachment provided with the measuring section 15 and is detachably attached to the ram 13.

The attachment section 216 is provided with an interface (not shown) via which the supply of electric power and transmission of a control signal and a signal such as distance information are performed with respect to the ram 13.

In this embodiment, a description will be given of the attachment section 216 that extends from the end of the ram 13 in the Z-axis direction and supports the measuring section 15 in the direction in which the central axis of the attachment section 216 is aligned with the Z-axis direction; however, the structure is not limited thereto. For example, a structure in which the measuring section 15 is supported such that the central axis of the attachment section 216 is parallel to an X-Y plane or a structure in which the direction of the central axis of the measuring section 15 can be controlled as desired may be used. The structure is not particularly limited.

As in the first and second embodiments, the measurement unit 215 is attached to the ram 13 when the NC program is debugged.

Like an attachment used for machining, the measurement unit 215 is automatically attached by the changer (not shown), which is used to exchange an attachment used for machining the workpiece W. When the measurement unit 215 is not used, for example, in a case where the workpiece W is machined, the measurement unit 215 is accommodated in an automatic-exchange storage box (not shown) provided in the machine tool 201, as in an attachment used for machining.

According to the above-described configuration, the measuring section 15 can measure the distance to the workpiece W and output the distance information acquired through the measurement to the shape recognition section 23, without using wiring for supplying electric power and transmitting the distance information. Specifically, the measuring section 15 measures the distance to the workpiece W upon reception of electric power supplied via the ram 13 and the attachment section 216, and the distance information acquired through the measurement is transmitted to the shape recognition section 23 via the ram 13 and the attachment section 216; therefore, it is not necessary to separately provide wiring for supplying electric power and transmitting the distance information.

Thus, since wiring etc. for connecting the measuring section 15 to the shape recognition section 23 is not required, interference between the workpiece W and the wiring etc. can be prevented.

REFERENCE SIGNS LIST 1, 101 machine tool
2, 102 workpiece measuring device
3, 103 collision preventing device
13 ram (main shaft)
15, 115 measuring section
23 shape recognition section
25 interference determination section (determination section)
26 movement control section (control section)
121 sensor head
123 transmission section
124 battery
216 attachment section
W workpiece
MP measurement geometry map

The invention claimed is:

1. A workpiece measuring device, comprising:
a measuring section that is attached to a main shaft to which a tool used for machining a workpiece serving as an object to be machined is attached and that measures a distance to the workpiece through scanning in a non-contact manner; and
a shape recognition section that generates a 3D mesh structure formed by dividing a space into polyhedrons, that calculates coordinates of a measurement point on the workpiece based on distance information about the measured distance to the workpiece, and that generates a measurement geometry map such that, when the ratio of the number of times the calculated measurement point is included in one unit of the 3D mesh structure to the number of times a position of the workpiece corresponding to the one unit is scanned is equal to or larger than a predetermined threshold, the one unit is regarded as part of the workpiece.

2. A workpiece measuring device according to claim 1, wherein the size of one side of the one unit is set based on the distance between the workpiece and a point at which the tool and the main shaft approaching the workpiece starts machining the workpiece.

3. A workpiece measuring device according to claim 1, wherein the measuring section comprises:
a sensor head that measures the distance to the workpiece through scanning;
a transmission section that transmits the distance information acquired through the measurement with the sensor head;
a battery that supplies electric power to the sensor head and the transmission section; and
a reception section that receives the distance information transmitted from the transmission section and that outputs the received distance information to the shape recognition section.

4. A workpiece measuring device according to claim 1, wherein the measuring section comprises an attachment section that receives electric power supplied via the main shaft and that outputs the measurement information to the shape recognition section via the main shaft.

5. A collision preventing device, comprising:
a workpiece measuring device according to claim 1;
a determination section that determines whether there will be interference between the measurement geometry map and at least one of the main shaft and the tool; and
a control section that controls the movement of the main shaft based on a determination result from the determination section.

6. A machine tool, comprising:
a table on which a workpiece serving as an object to be machined is placed;
a main shaft to which a tool used for machining the workpiece is attached; and
a collision preventing device according to claim 5.

* * * * *